L. L. SUMMERS.
PROCESS FOR THE SYNTHESIS OF GASES.
APPLICATION FILED NOV. 25, 1911.
1,130,940.
Patented Mar. 9, 1915.
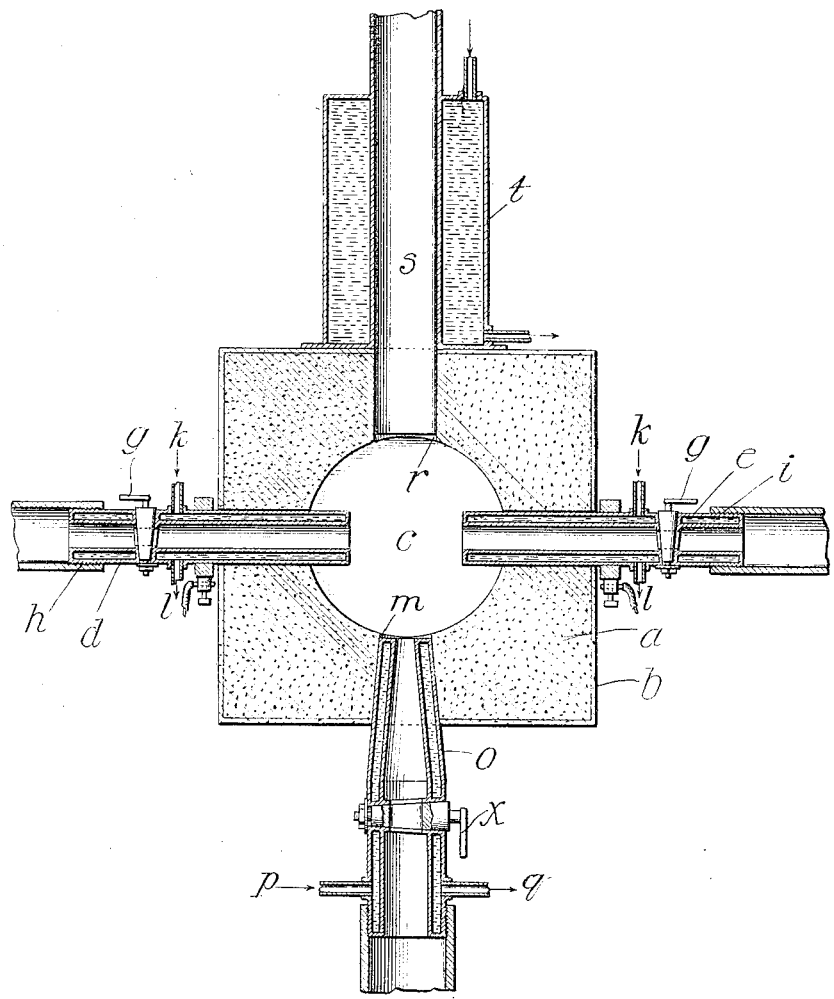

UNITED STATES PATENT OFFICE.

LELAND L. SUMMERS, OF CHICAGO, ILLINOIS.

PROCESS FOR THE SYNTHESIS OF GASES.

1,130,940.     Specification of Letters Patent.     Patented Mar. 9, 1915.

Application filed November 25, 1911. Serial No. 662,452.

*To all whom it may concern:*

Be it known that I, LELAND L. SUMMERS, a citizen of the United States, residing at Chicago, in the county of Cook and State of Illinois, have invented a certain new and useful Improvement in Processes for the Synthesis of Gases, of which the following is a specification.

My process is more particularly applicable to the formation of the compounds of nitrogen especially the oxids thereof and in the following specification I have described the process in detail with relation to these particular gases but it will be understood that the process and apparatus are not confined thereto but are applicable for the production of a wide range of endothermic reactions between gases.

In certain prior applications, to-wit, Serial No. 418,505, filed Feb. 29, 1908, and application Serial No. 494,386, filed May 6, 1909, I have described the formation of gaseous and other compounds by highly heating one of the elements which is to take part in the synthesis and injecting into contact with it another element in a cool or preferably cooled state. In the process more particularly described in these earlier applications however, the highly heated element is a solid and the element which is brought into the reaction zone in a cool state is a gas, nitrogen and mixtures thereof with hydrogen being the gas or gases whose reactions are specifically described. The present case however has to do with causing the combination of gases or substances both or all of which may be brought into gaseous or equivalent fluid form prior to or at the moment of their combination.

It is well known that certain gaseous compounds which require a high heat for their synthesis may be formed by bringing the component gases together in an electric arc and removing them as quickly as may be from the heat zone. The synthesis is readily effected at the high temperature of the arc but the compounds formed also tend to and do dissociate in the heat zone. Therefore it is the practice to remove them or the gases containing them from the heated zone as soon as possible after the desired compounds are formed in order to prevent their subsequent dissociation. A familiar example of such a process is the formation of the oxids of nitrogen from the air by passing a stream of the latter through an electric arc. My invention is also adapted to the formation of oxids of nitrogen but it involves a radical departure from the prior processes referred to above. In practising my invention the component gases are not fed together into the arc but are fed separately thereto and one of the gases, preferably the more inert gas, or in other words, that requiring the greater amount of energy in the form of heat for the dissociation of its molecules, is highly heated in the arc, and the other gas is mingled therewith at a lower temperature and preferably after being cooled. As a result the temperature of the product is lowered at the moment of formation to a point at which it is comparatively stable and by reason of the method in which the gases are fed the products are immediately removed from the intense heat zone. The molecular bonds of the more active of the two gases are sufficiently weakened at the lower temperature at which it is mingled with the more inert gas. By this practice I am enabled to avoid dissociation of the formed products and obtain a much higher percentage of the desired compounds in the gases or products withdrawn from the arc.

In the accompanying drawings I have shown in cross section a form of electric arc furnace which I have found well adapted for the practice of my invention. It will be understood, however, that the furnace may depart widely in construction from the specific form shown while remaining within the scope of my invention and that my process may be practised in a great variety of other furnaces in which the particular conditions which I have described below and pointed out in the following claims as essential may be realized.

As stated above the invention will be described in connection with the production of the oxids of nitrogen to which it is well adapted though it is to be repeated here that it is adapted to a wide range of uses in connection with other gases and the synthesis of other compounds which need not be specified here.

The furnace proper consists of a body portion of refractory material *a* surrounded by a sheet metal jacket *b* for protection against destruction and hollowed at its center to form a chamber c within which the combination is to take place. At diametrically opposite points in the furnace chamber electrodes d, e, enter and approach each other to a suitable distance for the formation of the desired arc. In the particular form shown the electrodes are hollow for a purpose which will be described and provided with valves g, g near their outer ends, which are likewise formed with connections such as screw threads h, i, for the attachment of conduits whereby gases may be fed through the interior of the electrodes. Preferably the electrodes are of metal and may be water cooled and as shown are provided with hollow walls for this purpose and nipples k, l for the attachment of water pipes. At a piont directly opposite the gap between the electrodes within the furnace is an opening m in the furnace wall into which projects a twyer or nozzle o for the injection of a gas and as shown this twyer is also water cooled, its walls being formed hollow for this purpose and provided with water tube nozzles p, q. A valve for the regulation of the gas supply is shown at x. Diametrically opposite the inlet port m in the wall of the furnace is formed an exit port r which communicates with an exhaust flue s which is water-jacketed at t for cooling the same. It will be obvious that if desired or found advantageous in the particular reaction which is being carried on a more powerful refrigerant than water may be employed but for most purposes the latter will answer.

In the practice of my process obviously the gases may be fed continuously. I have found, however, that better results are obtained especially in the case of a very inert gas such as nitrogen by practising the process in an intermittent manner. The nitrogen is fed into the furnace chamber and directly into the arc through the hollow electrodes d, e, and maintained in the arc which is preferably one of great power and inclosed in a comparatively small chamber until the temperature of dissociation of the nitrogen molecule is attained throughout the body of the gas or so much thereof as is found in practice to be advantageous, it being obvious that the efficiency of the process depends upon the proportion of the component gases which unite to form the desired products and that this is dependent in a measure upon the amount of nitrogen which is heated to the necessary temperature. When this temperature has been attained in the nitrogen, air or oxygen either at ordinary temperatures or preferably artificially cooled to a very low temperature in any manner, is injected through the twyer o and being under pressure, immediately mixes with the highly heated nitrogen, and the resultant products composed in the main of oxygen, nitrogen and compounds of these two gases, are driven by the force of the blast into the exhaust conduit s, where their temperature is immediately lowered. From this point the products may be led away to any point where they are desired for use or further combination as for example in the formation of cyanids by combination with calcium carbid.

While I prefer to use the electric arc as the means for securing the high temperatures desired, any other heating means which is capable of imparting to the gases sufficient heat energy may be employed and also other cooling means may, if desired, be substituted for that shown and described. The oxygen or other comparatively active gas may be reduced in temperature even to the point of liquefaction or liquid air or oxygen may be employed. It will be apparent also that the invention is applicable to the treatment and synthesis of substances which are not normally gaseous but which by spraying, heating or in any other manner may be supplied in a sufficiently fluid condition to the arc.

As an additional example of a substance which may be synthetically formed by my process I may cite ammonia. In the formation of this gas the comparatively inert nitrogen is as before fed through the electrodes and highly heated in the arc and the hydrogen injected thereinto in a comparatively cooled state through the twyer o. It will be also obvious that my invention is not confined to the combination of two gases alone but is equally applicable to the synthesis of substances from any number of gases or gas-like substances, the more inert of the gases in carrying out any reaction being preferably highly heated and the more active gas injected thereinto in a comparatively cool state.

I claim:

1. The process for the synthesis of gaseous compounds consisting in highly heating one or more of the constituent gases and mixing other gas or gases with it in a region of intense heat and while the latter are in a cool state.

2. The process for the synthesis of gaseous compounds consisting in highly heating one or more of the constituent gases and mixing other gas or gases with it in a region of intense heat and while the latter are in a cool state and quickly cooling the resultant gases.

3. The process for the synthesis of gaseous compounds consisting in highly heating one or more of the constituent gases in a heated zone or region, bringing the other constituent gas or gases in contact therewith in said zone and quickly removing the resultant gases from the heated zone.

4. The process for the synthesis of gaseous compounds consisting in hightly heating one or more of the constituent gases in a heat zone and injecting thereinto a relatively cool gas under pressure whereby the gases are caused to combine and at once removed from the heated zone.

5. The process for the synthesis of gaseous compounds consisting in highly heating one or more of the constituent gases to be combined for an appreciable period and then injecting a relatively cool gas thereinto whereby the gases are caused to combine and at once removed from the heated zone.

6. The process for the synthesis of gaseous compounds consisting in highly heating one or more of the constituent gases in an electric arc, injecting a cool gas into the arc and removing the products immediately from the heated zone.

7. The process for the synthesis of gaseous compounds consisting in highly heating one or more of the constituent gases, cooling the other gases to be combined and mixing the gases.

8. The process for the synthesis of gaseous compounds consisting in highly heating the more inert of the constituent gases to be combined and feeding the more active gas or gases in a cool state thereto.

9. The process for the synthesis of gaseous compounds consisting in highly heating the more inert gas in a heated zone, feeding the more active gas in a cool state thereto and immediately removing the products from the heated zone.

10. The process for the synthesis of gaseous compounds consisting in highly heating the more inert gas, cooling the more active gas, mixing the gases in a heated zone and immediately removing them to a cooler zone.

11. The process for the formation of nitrogen compounds consisting in highly heating nitrogen in a heat zone and feeding thereto gas to be combined therewith in a cool state and removing the products from the heated zone.

12. The process for the formation of nitrogen compounds consisting in heating the nitrogen in an electric arc, feeding gases to be combined therewith in a cool state to the arc and at once removing the products to a cooler region.

13. The process of forming nitrogen compounds consisting in subjecting the nitrogen to a prolonged heating in an electric arc, feeding gases to be combined therewith in a cool state to the heated zone produced by the electric arc and removing the product from the heated zone.

14. The process for the production of oxids of nitrogen consisting in highly heating nitrogen and feeding oxygen in a cool state thereto.

15. The process of forming oxids of nitrogen consisting in highly heating nitrogen in a heated zone, feeding oxygen in a cool state thereto and removing the products from the heated zone.

16. The process for the production of the oxids of nitrogen consisting in heating nitrogen in an electric arc, injecting cool oxygen into the region of the arc and removing the product from the heated zone.

17. The process for the production of oxids of nitrogen, consisting in heating nitrogen in an electric arc, cooling the oxygen, injecting the cooled gas into the body of highly heated nitrogen and removing the product from the heated zone.

LELAND L. SUMMERS.

Witnesses:
JOHN B. MACAULEY,
ROBERT DOBBERMAN.